Figure 1:
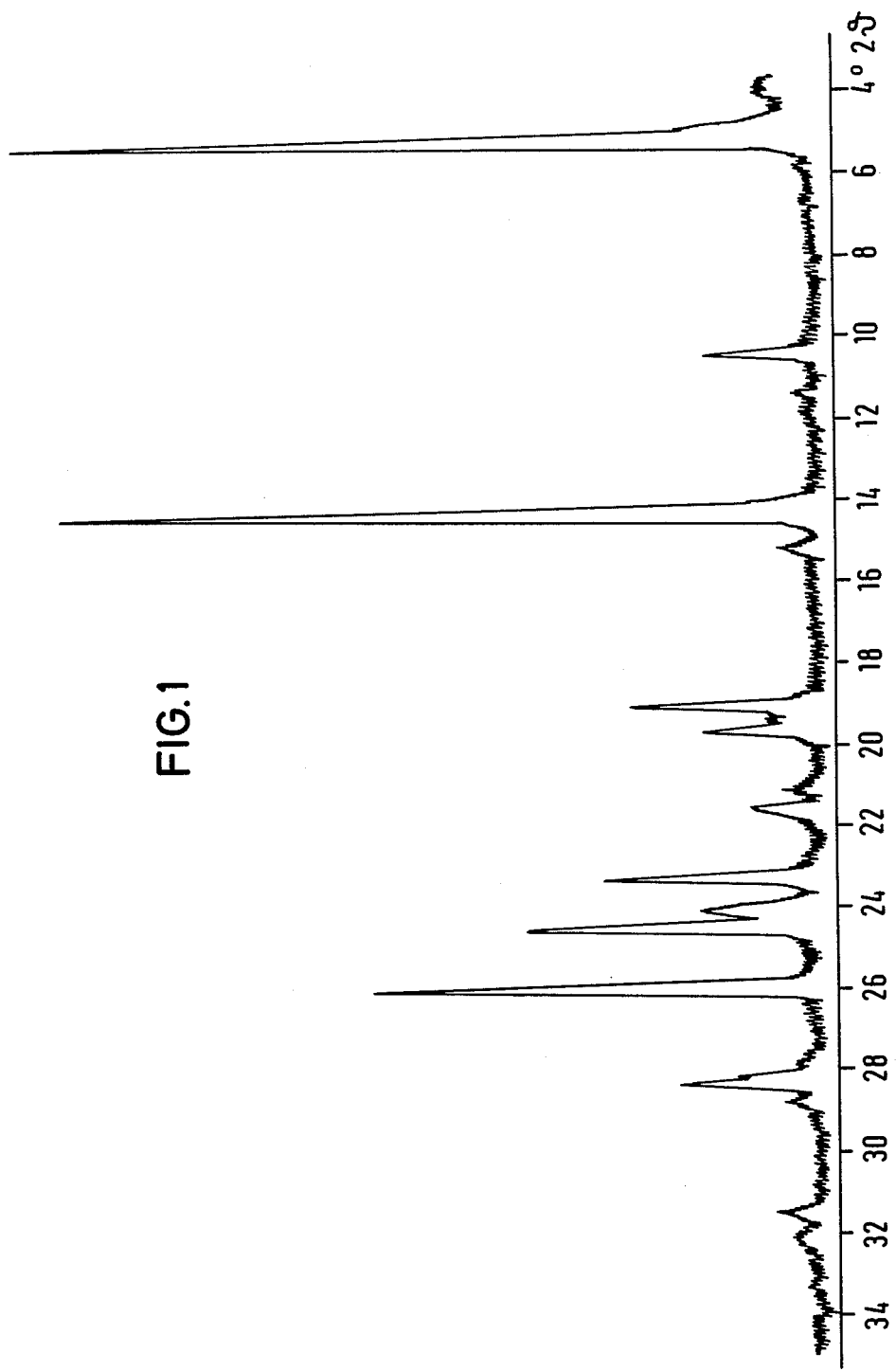

United States Patent [19]

Spietschka et al.

[11] Patent Number: 4,742,170
[45] Date of Patent: May 3, 1988

[54] MIX-CRYSTAL PIGMENTS BASED ON PERYLENETETRACARBIMIDES, PROCESS FOR THEIR PREPARATION, AND THEIR USE

[75] Inventors: Ernst Spietschka, Idstein/Taunus; Helmut Tröster, Königstein/Taunus, both of Fed. Rep. of Germany

[73] Assignee: Hoechst Aktiengesellschaft, Frankfurt am Main, Fed. Rep. of Germany

[21] Appl. No.: 782,685

[22] Filed: Oct. 1, 1985

[30] Foreign Application Priority Data

Oct. 3, 1984 [DE] Fed. Rep. of Germany ....... 3436209

[51] Int. Cl.$^4$ .................... C09B 5/62; C07D 491/06
[52] U.S. Cl. ........................................ 546/37; 524/90
[58] Field of Search ............................ 546/37; 524/90

[56] References Cited

FOREIGN PATENT DOCUMENTS

| 1094897 | 12/1960 | Fed. Rep. of Germany . |
| 1807729 | 6/1970 | Fed. Rep. of Germany . |
| 2009073 | 9/1970 | Fed. Rep. of Germany . |
| 51-7025 | 1/1976 | Japan . |
| 897707 | 5/1962 | United Kingdom . |

OTHER PUBLICATIONS

Nagao, et al., Chem. Abstracts, vol. 100, (1984), entry 211628g.
Nagao, et al., Chem. Abstracts, vol. 93, (1980), entry 241183n.

*Primary Examiner*—Donald G. Daus
*Assistant Examiner*—William A. Teoli, Jr.

[57] ABSTRACT

Perylenetetracarbimide mix-crystal pigments in the crystal lattice of the α- Modification of N,N'-bis-3',5'-dimethylphenylperylenetetracarbimide of the formula (1) comprising 98-70 mole percent of the symmetrical diimide of the formula (1) and correspondingly 2-30 mole percent of at least one asymmetrical diimide of the formula (2)

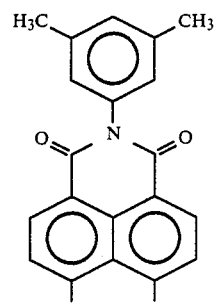

(1)

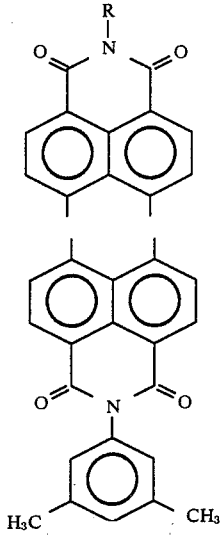

(2)

in which R denotes a hydrogen atom or a methyl group.

4 Claims, 3 Drawing Sheets

MIX-CRYSTAL PIGMENTS BASED ON PERYLENETETRACARBIMIDES, PROCESS FOR THEIR PREPARATION, AND THEIR USE

The present invention relates to new mix-crystal pigments based on perylenetetracarbimides in the crystal lattice of the α-modification of N,N'-bis-3',5'-dimethylphenylperylenetetracarbimide, to a process for their preparation, and to their use for coloring organic polymers.

For use in high-melting plastics, pigments should not only have high light and weathering fastness properties but also be able to withstand the high processing temperatures without change in the color impression, i.e. have adequate thermostability. In this field of use, there is increasing interest in organic colorants as alternatives to the previously predominantly used cadmium pigments.

The range of available organic pigments for high-melting synthetic polymers in particular polyolefins, is incomplete owing to the required high thermostability.

It has been known for a long time that the perylene pigment of the formula (1)

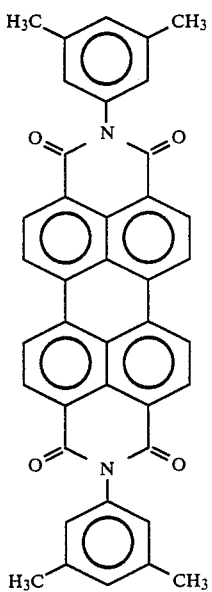

is particularly suitable for obtaining bright red shades in the field of use in question. This compound, which is obtainable by the method of German Pat. No. 1,067,157 (U.S. Pat. No. 2,905,685) and which is produced therein in a crystal phase which is referred to in Japanese Patent Application No. J 51007-025 and in European Pat. No. 023,191 (U.S. Pat. No. 4,404,385) as α-modification, produces after conversion into a finely divided pigment form, for example by means of conventional milling in a vibratory or roll mill a pure red coloration of high tinctorial strength and good thermostability.

The increased use of high-melting polymers such as polypropylene and the trend toward higher production speeds in the case of plastics goods has in recent years led to a toughening of the thermoconditions and hence also to the demand for a further increase in the thermostability of this pigment.

Moreover, many plastics converters have long expressed a wish for a distinctly yellower strong red of appropriate fastness level.

It is true that N,N'-bis-4'-ethoxyphenylperylenetetracarbimide of the formula (3)

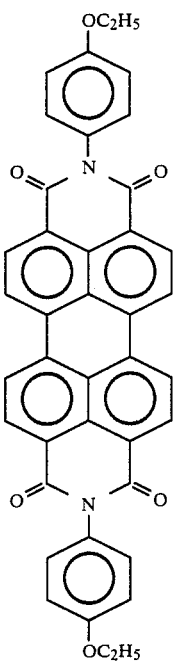

which has been known for a long time is such a bright yellowish red. However, the inadequate thermostability of this pigment rules out any use in high-melting polymers, in which, at the high processing temperatures, it undergoes a color change toward bluish red.

The invention provides new perylenetetracarbimide mix-crystal pigments in the crystal lattice of the α-modification of N,N'-bis-3',5'-dimethylphenyl-perylenetetracarbimide of the formula (1) comprising 98–70 mole percent of the symmetrical diimide of the formula (1) and correspondingly 2–30 mole percent of at least one asymmetrical diimide of the formula (2) in which R denotes a hydrogen atom or a methyl group

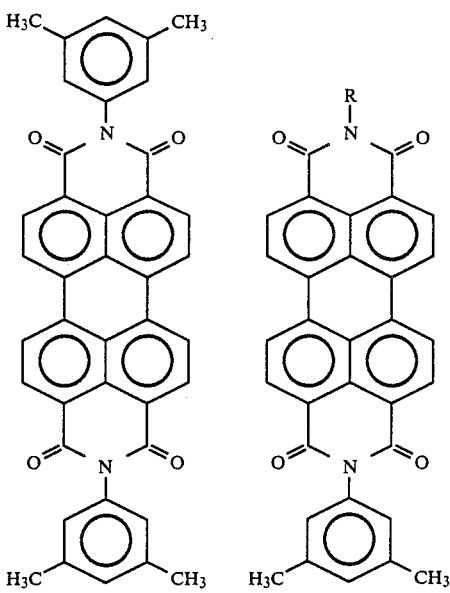

a process for their preparation by condensing a mixture of 98–70 mole percent of perylenetetracarboxylic dianhydride and correspondingly 2–30 mole percent of at least one perylenetetracarboxylic monoanhydride of the formula (4)

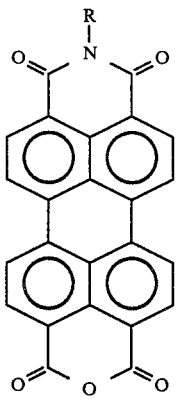

in which R has the abovementioned denotation, with an at least stoichiometric amount of 3,5-dimethylaniline in a manner known per se, and their use for coloring organic polymers.

The perylenetetracarbimide mix-crystal pigments thus obtainable produce after conversion into a finely divided pigment form using customary finishing methods, for example milling, in high-melting polymers, in particular in polyethylene and polypropylene, colorations which, when compared with the pure pigment of the stated formula (1), have not only the desired yellower hue but also a distinctly improved thermal stability.

The new perylenetetracarbimide mix-crystal pigments which are composed of the compound of the stated formula (1) and at least one component of the stated formula (2) in the abovementioned molar ratio form mix-crystals which crystallize in the same crystal lattice as the α-modification of the compound of the stated formula (1).

Figure 2:
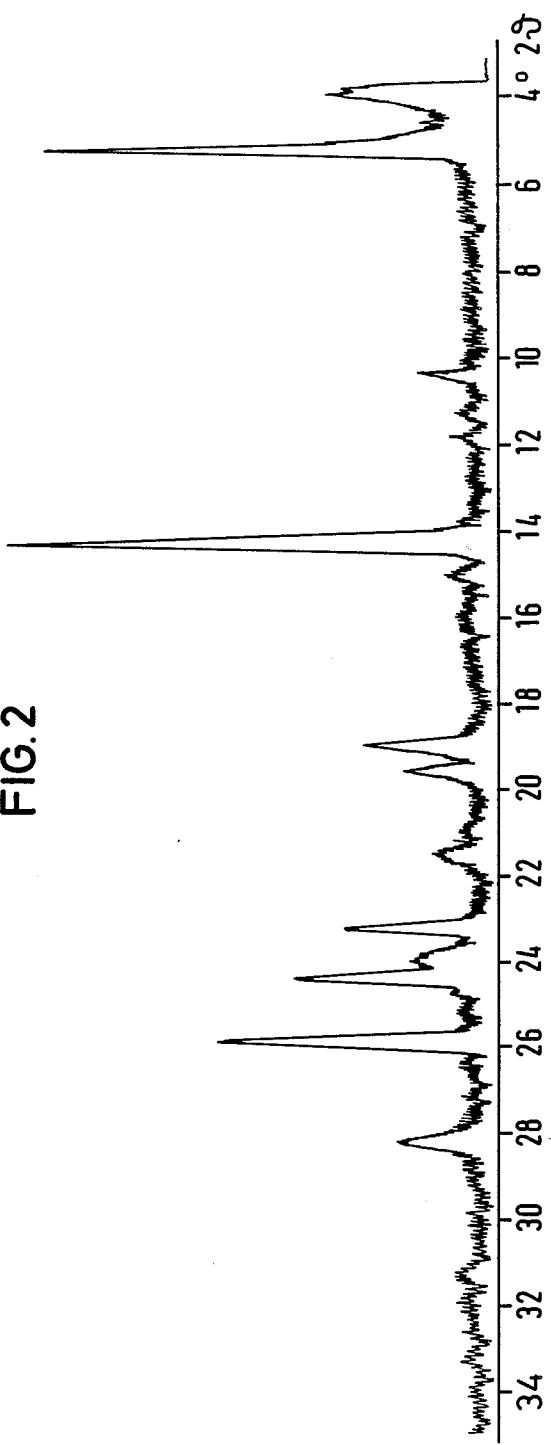
Figure 3:
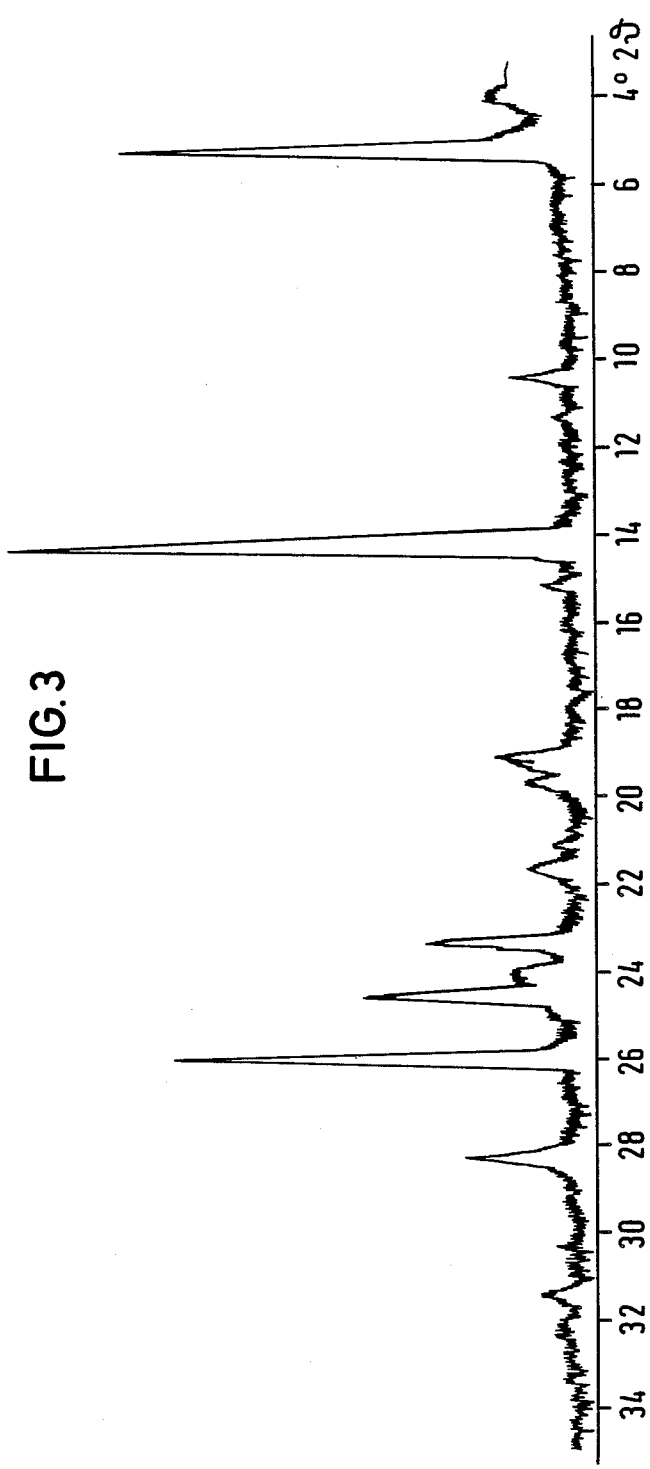

The appendix shows for comparison the x-ray diffraction diagrams of the crystal lattice of two typical mix-crystals obtainable according to the invention (FIGS. 2 and 3) and of the α-modification of the compound of the stated formula (1) (FIG. 1). It can be seen that the diagrams are identical, from which it follows that the crystal lattices are also identical.

The amount of monoanhydride or monoanhydride mixture of the stated formula (4) used in the co-condensation is preferably 5–15 mole percent, so that as a consequence of the virtually quantitative conversion, the preferred amount of the compound or of the component mixture of the formula (2) in the mixed phase of the components of the formulae (1) and (2) is correspondingly likewise between 5 and 15 mole percent.

The starting materials of the stated formula (4) are known. They can be obtained for example in accordance with the indications of German Offenlegungsschrift No. 3,017,185.

The co-condensation reaction can be carried out in a known manner, for example in accordance with the indications of German Pat. No. 1,105,085 (British Patent No. 897,707), German Auslegeschrift 1,094,897 or German Offenlegungsschrift No. 1,807,729, by reacting the mixture of reactants at elevated temperature of about 150°–220° C., in the presence or absence of a condensation accelerant such as zinc chloride, zinc carboxylate or any mineral acid, in a high-boiling solvent, such as, for example, dichlorobenzene, trichlorobenzene, nitrobenzene, N-methylpyrrolidone, quinoline, phenols or also in an excess of 3,5-dimethylaniline. The reaction products can be separated off in a conventional manner by filtration, if desired after prior dilution with a low-boiling alcohol, such as methanol.

To convert the resulting dry crude pigment into a finely divided, transparently coloring pigment form, the crude pigment can be milled conventionally, for example in a vibratory or roll mill, in the presence of milling assistants. The milling bodies generally used therein are steel or corundum balls or steel or corundum cylpebs. The milling assistants can be water-soluble salts, such as sodium sulfate, aluminum sulfate or sodium chloride, which, after the milling has been completed, are separated from the pigment in known manner by aqueous salt extraction.

Mix-crystal pigments of the perylenetetracarbimide series are already known. U.S. Pat. No. 3,554,776 claims pigments comprising a solid solution of at least two perylenetetracarbimides. The compounds underlying these pigments are symmetrical N,N'-substituted perylenetetracarbimides. By comparison, the mix-crystals according to the invention where one component of the stated formula (4) is a defined asymmetrically substituted diimide have a different chemical composition.

This is also true of the solid solutions of perylenetetracarbimide pigments disclosed in German Offenlegungsschrift No. 2,009,073 (Canadian Pat. No. 912,757). These pigments are likewise mixtures composed of symmetrically N,N'-substituted perylenetetracarbimides.

The new mix-crystal pigments obtainable according to the invention are suitable for coloring paints and plastics, such as polyvinyl chloride, polystyrene or polyamide, and are particularly advantageous for pigmenting high-melting polymers, such as polyethylene and polypropylene, and for spin-coloring polypropylene. Compared with the perylene pigment of the stated formula (1) obtainable for example in accordance with German Pat. No. 1,067,157 they have the same crystal modification—after corresponding conversion into a finely divided, transparently coloring pigment form—and in high-melting organic polymers, in particular in polyolefins, an at least equal tinctorial strength and a yellower hue but also a distinctly higher heat stability.

Compared with the opaquely coloring pigment forms of the bis-xylidide of the stated formula (1) disclosed in German Auslegeschrift 2,832,761 (U.S. Pat. No. 4,262,851) and European Patent 042,819 (U.S. Pat. No. 4,404,386), they have a distinctly yellower, purer hue and a superior tinctorial strength.

In the following examples, the percentages are by weight unless otherwise stated.

The x-ray diffraction diagrams were prepared with copper-$K\alpha_1$-radiation on a Guinier counting tube diffractometer from Huber.

EXAMPLE 1

35.3 g of perylenetetracarboxylic dianhydride and 3.9 g of perylenetetracarboxylic monoanhydride monoimide are reacted at 180° C. in the presence of 2.7 g of anhydrous zinc chloride in a mixture of 420 g of 3,5-dimethylaniline quinoline (weight ratio 1:1) for 7 hours with continuous removal of the water of reaction by distillation. The uniformly crystallized reaction product of the α-crystal modification (cf. FIG. 2 in the appendix) is filtered off with suction, is washed with ethanol and 2% strength hydrochloric acid and then with 2% strength potassium hydroxide solution until the filtrate running off is colorless and finally with water until neutral, and is dried.

The 58.3 g of isolated co-condensation product are 90 mole percent component of the formula (1) and about 10 mole percent component of the formula (2) (with R=H), which corresponds to a yield of ≙99.2% of theory.

To convert into a finely divided pigment form, 30 g of co-condensation product are milled with 150 g of anhydrous sodium sulfate in a 1 liter plastics milling vessel holding 1400 g of corundum balls (diameter 12 mm) on a Vibratom vibrating table for 6 hours, and the mill base is dried after an aqueous salt extraction and is comminuted in a IK cross beaker mill (from JANKE und KUNKEL). (The same method is also used to comminute the products obtained in the following examples).

EXAMPLE 2

If instead of 3.9 g of the monoanhydride monoimide 4.1 g of perylenetetracarboxylic monoanhydride monomethylimide are used and the procedure used is otherwise as described in Example 1, this gives 58.3 g of a uniformly crystallized co-condensation product in the α-modification (cf. FIG. 3 in the appendix), which corresponds to a yield of 99.0% of theory.

The product thus obtained is about 90 mole percent component of the formula (1) and about 10 mole percent component of the formula (2) (with R=—CH₃).

EXAMPLE 3

A suspension of 35.3 g of perylenetetracarboxylic dianhydride, 2.0 g of perylenetetracarboxylic monoanhydride monoimide and 2.0 g of perylenetetracarboxylic monoanhydride monomethylimide is reacted at 180° C. in 250 g of 3,5-dimethylaniline in the presence of 4.0 g of crystalline zinc acetate for 6 hours. The reaction mixture is diluted with 300 ml of methanol and then worked up as described in Example 1.

The 58.3 g of isolated uniformly crystallized co-condensation product of the α-modification is about 90 mole percent component of the formula (1) and about 5 mole percent each component of the formula (2) (with R=H and —CH₃), which corresponds to a yield of 99.1% of theory.

EXAMPLE 4

(comparative example)

62.0 g of perylenetetracarboxylic dianhydride are stirred at 185° C. in 210 g of 3,5-dimethylaniline in the presence of 3.2 g of anhydrous zinc chloride for 8 hours, and the resulting bis-xylidide of the formula (1) is isolated in the manner described in Example 1. The yield is 92.5 g (97.9% of theory). The reflection angles in the x-ray diffraction diagram (cf. FIG. 1 in the appendix) agree with the angles disclosed in the abovementioned Japanese patent application for the crystal phase, referred to as the α-modification, of this compound.

Determination of the heat stability by the DIN 53772-A test 0.75 g of the pigment to be tested and 500 g of polyethylene (®Hostalen GC 7260 powder) are mixed at room temperature and 2000 revolutions per minute in a Collin high-speed mixer for one minute. After addition of 7.14 g of ®Remafin White RCL-AE 30 (≙1% TiO₂) the mixture is extruded at 180° C. in 2 passes on an extruder (Weber ET 20). The resulting granulate is subsequently molded on an injection molding machine (Aarburg Allrounder 221 E/170 P) into sheets at test temperatures of 200°–300° C. in intervals of 20° C. and a dwell time of 5 minutes.

| Results (standard depth of shade ⅓ after DIN 53235) | | |
|---|---|---|
| Example | Heat stability (color difference $\Delta E^*_{ab} = 3$) | Hue angle (DIN 6174) |
| 1 | >300° C. | 24.3° |
| 2 | >300° C. | 24.9° |
| 3 | 300° C. | 24.1° |
| 4 (comparison) | 270° C. | 23.3° |

We claim:
1. A perylenetetracarbimide mix-crystal pigment in the crystal lattice of the α-modification of N,N'-bis-3',5'-dimethylphenylperylenetetracarbimide of the formula (1) comprising 98–70 mole percent of the symmetrical diimide of the formula (1) and correspondingly 2–30 mole percent of at least one asymmetrical diimide of the formula (2)

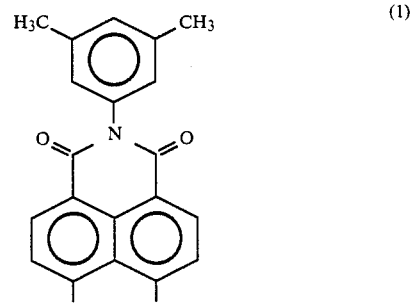

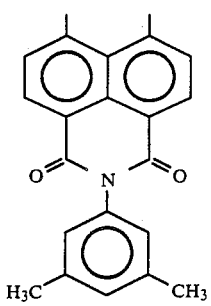

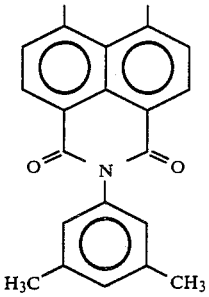

(2)

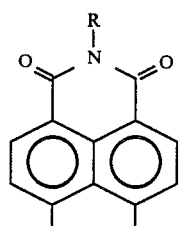

in which R denotes a hydrogen atom or a methyl group.

2. The perylenetetracarbimide mix-crystal pigment as claimed in claim 1 comprising 95–85 mole percent of the symmetrical diimide of the formula (1) and correspondingly 5 to 15 mole percent of at least one asymmetrical diimide of the formula (2).

3. A method for coloring an organic polymer comprising the step of coloring the polymer with the perylenetetracarbimide mix-crystal pigment of claim 1.

4. A method according to claim 3 wherein the resulting colored organic polymer is subsequently molded at a temperature above 200° C.

* * * * *